Patented Oct. 4, 1938

2,131,757

UNITED STATES PATENT OFFICE 2,131,757

OIL-SOLUBLE PHENOLIC CONDENSATE

Israel Rosenblum, Jackson Heights, Long Island, N. Y.

No Drawing. Application May 19, 1934,
Serial No. 726,579

2 Claims. (Cl. 260—4)

The present invention relates to the production of fusible and soluble resinous condensation products suitable for use in the manufacture of coating compositions of various kinds.

It is the general object of the present invention to produce an oil-soluble phenolic condensation product of high melting point, unusual lightness of color, of great weather resistance and durability, and good film-forming properties.

I have found that certain of the higher homologues of phenol can be utilized to great advantage in the production of soluble resins for use in the manufacture of varnishes, paints, etc. I have discovered that by the use of, for example, amyl or butyl phenols, or mixtures thereof, soluble resins can be obtained having an unusually large amount of combined formaldehyde and of superior resistance and durability as compared with resins obtained with ordinary phenol or cresol and formaldehyde. I have found further that resinous condensates can be made with such higher phenols and an aldehyde in a very simple manner, and that the same can be combined with a natural resin and a polyhydric alcohol in such a manner that an oil-soluble resin is obtained which is high in phenol resin content and is substantially neutral, so that the same can be employed with basic pigments.

It has already been suggested to employ amyl and butyl phenols for the production of resinous condensation products. See the patents to Honel Nos. 1,800,295 and 1,800,296. According to the first patent only approximately equimolecular proportions of the phenol and formaldehyde may be reacted at boiling temperature; with larger quantities of formaldehyde, the phenol must first be dissolved in an alkali and reacted with the formaldehyde for a long time at a temperature no higher than about 55° C. to avoid infusibility; the resin is then precipitated with acid. According to the second patent, the phenolic substance and aqueous formaldehyde are reacted for a long time at approximately room temperature in the presence of sufficient alkali hydroxide to produce a clear solution, the reaction product being precipitated with acid reacting agents (page 2, line 123 to page 3 line 3), and then heated with triglycerides, such as melissic palmitate.

These reactions are slow and bothersome, especially when applied on a commercial scale. Moreover, it will be evident that in these known processes any acidity that the phenolic condensate may develop will remain and the product will accordingly have a considerably high acid number.

According to the present invention an alkyl substituted phenol higher than cresol in the homologous series, and preferably p-tertiary amyl and butyl phenol and isobutyl phenol, and an aldehyde, preferably formaldehyde, in the proportion of considerably more than 1 mol, and even more than two mols of aldehyde to one mol of the phenol, are caused to react to form an initial, fusible condensate, preferably in the presence of a solvent, such as an acidic natural resin, turpentine, and dipentene. If no natural resin was present during the formation of the initial condensate such resin is then added and the temperature raised to about 180° C., whereupon glycerol is added in quantity sufficient to neutralize the mass completely. At such relatively low temperature there are formed, particularly if an organic metal salt, preferably of zinc, is present, the partial polyhydric alcohol esters of a natural resin acid, such as glycerol mono and di-abietate or resinate; if desired, glycerol mono- and di-resinate may be added to the initial phenol-aldehyde condensate. The final stage of the reaction takes place at about 240-260° C. In this way the acidity of the final product is reduced to a very low value, the reaction probably taking the course of the formation of a mixed polyhydric alcohol ester of the natural resin and the phenolic condensate.

The partial polyhydric alcohol ester of the natural resin is preferably formed in situ in the presence of the condensate of the substituted phenol and the aldehyde. The condensation of the phenol and aldehyde may thus take place in the presence of a natural resin, and after the expulsion of water of reaction and also of solution, there is added the polyhydric alcohol, preferably glycerol, at a relatively low temperature, as indicated above, such temperature in the case of glycerol being in the neighborhood of 160 to 200° C. Under such circumstances there appears to be formed relatively large quantities of glycerol mono- and diresinate together with the tri-ester. The partial esters appear to be capable of reacting with the phenolic condensate, whereas glycerol itself does not appear to be able to attack such condensate directly. The condensation of the substituted phenol and aldehyde and the neutralization of the condensate can thus be made to take place in one continuous operation without intermediate separation of the phenolic condensation product from the other materials of the mixture.

The present invention contemplates in particular the use of amyl and butyl phenol and preferably the para substituted compounds. I have found that the condensates obtained with these phenols are highly reactive with glycerol mono- and diabietates, for example, and yield products of low acid number. While other aldehydes and also ketones may be employed in the reaction, formaldehyde has been found to give best results.

The invention contemplates further the production of an oil-soluble phenolic condensate which not only has a relatively high proportion of phenol condensate in the total resin, but has also a high proportion of formaldehyde relatively to the phenol. This high proportion of formaldehyde is highly desirable as it increases the resistance of the resin to weather and other influences.

The invention will be further described with the aid of the following examples which illustrate several satisfactory methods of carrying out the invention.

Example I

| | Parts |
|---|---|
| Amylphenol | 10 |
| Forty per cent formaldehyde solution | 13.5 |
| Rosin | 100. |
| Zinc acetate | 0.25 |

The mixture is heated under pressure at 110° C. for about 12 hours. The temperature is then slowly raised to 180°, the mass being dehydrated by blowing off steam under pressure. At this point 11 parts of glycerol are added and the temperature gradually raised to effect esterification, steam and other volatile matter being blown off under pressure, until the temperature of 240° C. is reached. The latter temperature is maintained for about 12 hours, or until the reaction is completed and a hard, clear resin of acid number about 12 is obtained. The resin is soluble in common varnish solvents, and particularly in varnish oils and mineral spirits, and is of low viscosity.

In place of the zinc acetate an equivalent quantity of any other suitable organic salt of zinc may be used.

Example II

| | Parts |
|---|---|
| Para-tertiary amylphenol | 10 |
| Forty per cent formaldehyde solution | 14 |
| Turpentine or dipentene | 5 |
| Zinc resinate | .3 | are heated under pressure at about 110° C. for about 20 hours or under reflux at boiling temperature. The mechanical water and also water of reaction are then removed, under pressure at about 110°–130° C., or preferably by applying vacuum at lower temperature. The 29.3 parts of reacting materials yield about 16 parts of liquid condensate.

Thirty (30) parts of above liquid (corresponding to about 20 parts of amylphenol-formaldehyde condensate) are heated with 100 parts of rosin, or other natural resin, preferably cracked, reaching the temperature of 180° C. Any solvent distilled over can be condensed and collected. At the temperature of 180° C. there are added 11 parts of glycerol and the mixture esterified by gradually raising the temperature to 240° C., steam being blown off under pressure, the mass being maintained at about 240° for about 12 hours to complete the esterification. Vacuum can be applied at 240° C. to facilitate the removal of the slight amount of free glycerol that may be present. A very hard resin having an acid number of 15–20 is obtained which is readily soluble in oils and in varnish solvents.

Example III

Same as Examples 1 and 2, except that amylphenol is substituted by an equivalent amount of butyl phenol. Oil-soluble resins of properties similar to those obtained in the preceding examples are obtained.

The glycerol can be replaced by other polyhydric alcohols, while in place of zinc acetate, other substantially neutral compounds, like the abietate, linoleate, oleate, stearate, tungate, benzoate, etc. may be used, and also of the other metals of the second group of the periodic system. The corresponding salts of cobalt, manganese, sodium and potassium may also be used.

It will be noted that in the examples given above, the ratio of formaldehyde to phenol is unusually high, being more than 2 to 1 and even more than 2½ to 1 in the examples given above; the product is nevertheless characterized by ready solubility in oils, mineral spirits, turpentine and other common solvents.

I claim:

1. The method of producing an oil-soluble resinous phenolic condensate, which comprises reacting one mol. of a phenol higher than cresol in the homologous series with at least about two mols of formaldehyde in the presence of dipentene and of an organic salt of zinc at approximately the boiling point of the mixture until a fusible condensate is formed, heating said condensate with an acidic natural resin, and then reacting the mixture with a polyhydric alcohol at higher temperatures until a clear, soluble resin is obtained.

2. The method of producing an oil-soluble phenolic resin, which comprises reacting one mol. of a phenol selected from the group consisting of amyl and butyl phenols, with more than two mols of formaldehyde in the presence of dipentene at a temperature of approximately 100–110° C. under approximately neutral conditions until an initial, fusible condensate is obtained, heating the condensate with rosin, adding glycerol in an amount approximately 11% by weight of the rosin, raising the temperature to approximately 240° C., and continuing the heating at such temperature until a clear resin of reduced acid number is obtained.

ISRAEL ROSENBLUM.